Figure 1:
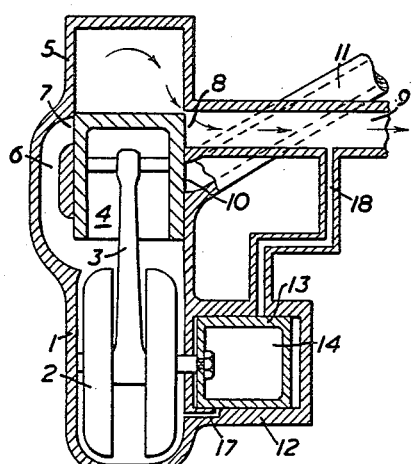

April 2, 1963 J. EHRLICH 3,083,702
INTERNAL COMBUSTION ENGINES
Filed Nov. 30, 1961 3 Sheets-Sheet 1

INVENTOR
JOSEF EHRLICH

BY
ATTORNEYS

April 2, 1963   J. EHRLICH   3,083,702
INTERNAL COMBUSTION ENGINES
Filed Nov. 30, 1961   3 Sheets-Sheet 3

INVENTOR
JOSEF EHRLICH
BY
ATTORNEY

United States Patent Office 3,083,702
Patented Apr. 2, 1963

3,083,702
INTERNAL COMBUSTION ENGINES
Josef Ehrlich, London, England, assignor to The De Havilland Engine Company Limited, Leavesden, England, a company of Great Britain
Filed Nov. 30, 1961, Ser. No. 156,036
10 Claims. (Cl. 123—73)

The present invention relates to improvements in internal combustion piston engines.

It has been observed that in the exhaust pipe or duct of an internal combustion engine near the exhaust valve or port, the gas pressure, after rising sharply on opening of the valve or port at the end of the combustion stroke of the engine, falls to below atmospheric pressure for a short time. In a particular two-stroke engine under test, it was found that after an initial pressure increase of about 8 inches of mercury, the pressure in the exhaust pipe fell to below atmospheric pressure during a period corresponding to about 15° of rotation of the crank, reaching a maximum depression of about 6 inches of mercury below atmospheric pressure. In a particular engine, the duration of the sub-atmospheric pressure and the value of the depression below atmospheric pressure appear to depend to some extent on the engine speed.

It is an object of the present invention to use this sub-atmospheric pressure effect, and thus to recover a portion of the kinetic energy of the exhaust gas, which would otherwise be wasted, to assist in the filling of the charging or scavenging device from which air or air-fuel mixture is admitted to the engine cylinder.

According to the invention there is provided an internal combustion piston engine comprising a working cylinder, an exhaust port or valve leading therefrom into an exhaust duct, a transfer port or valve leading into the cylinder from container means for air or air-fuel mixture, and means for refilling the said container means during each working cycle and establishing a superatmospheric pressure therein prior to opening of the transfer port or valve during each working cycle, wherein there is provided, connected to the said exhaust duct, vacuum transferring means which is adapted to have produced in it a partial vacuum due to a partial vacuum developed in the exhaust duct after an initial surge of exhaust gas pressure as the exhaust valve or port is opened during each working cycle of the engine, the vacuum-transferring means being also connected to the said container means so as to apply thereto, in the interval between closure of the transfer port or valve and the commencement of refilling of the said container means, during each working cycle, the partial vacuum so produced in the vacuum transferring means, whereby the said container means is partially evacuated to assist the said refilling thereof.

The vacuum transferring means conveniently comprises valve apparatus and a reservoir, the valve apparatus serving during each engine cycle to connect the reservoir to the exhaust duct when the sub-atmospheric depression occurs in the exhaust duct and to shut off such communication before said sub-atmospheric depression terminates and subsequently to place the reservoir in communication with the said container means prior to the refilling of the latter with air or mixture.

The term "reservoir" used above and hereinafter, therefore, is to be understood as meaning a chamber in which a condition of sub-atmospheric depression is created by connecting it to the exhaust passage at the appropriate time and then "locked up" and relieved by subsequently connecting the "reservoir" to the said container means prior to the refilling of the latter by air or mixture. Moreover it is to be understood that the "reservoir" may be constituted by a duct of suitable dimensions.

In some cases only that part of the valve apparatus which serves to connect the reservoir to the container means may be mechanically operated in synchronism with the engine crank shaft, while the part of the valve apparatus which controls communication between the reservoir and the exhaust passage may be in the form of a suitable non-return valve, while alternatively communication between the reservoir and both the container means and the exhaust passage may be controlled by parts of the valve apparatus mechanically operated in synchronism with the crank shaft.

The invention is particularly but not exclusively applicable to two-stroke internal combustion engines of the kind in which the crank case constitutes the container means for the charge, in which the charge is compressed by movement of the piston prior to entry into the working cylinder and in which exhaust and transfer ports are controlled by the piston while an inlet port is either controlled by the piston or by separate valve means, and various embodiments of the invention as applied to two-stroke internal combustion engines of the kind in which exhaust and transfer ports are controlled by the piston are shown diagrammatically by way of example in the accompanying drawings, in which FIGURES 1 to 5 are cross-sections through one form of two-stroke engine of the kind referred to embodying the invention showing various stages in the cycle of operation.

Figure 6:
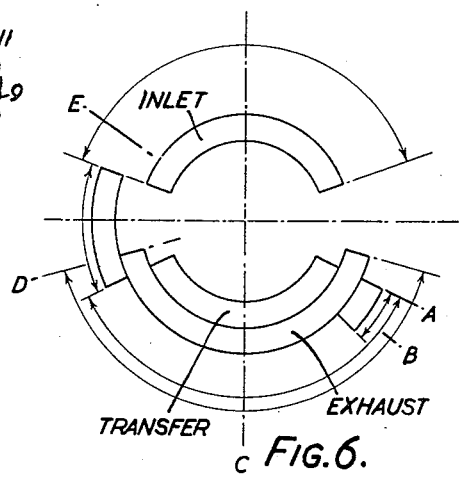

FIGURE 6 is a timing diagram showing a typical example of the opening and closing of the ports of an engine constructed as shown in FIGURES 1 to 5, FIGURE 7 is a similar view to FIGURES 1 to 5 showing another form of engine incorporating the invention, FIGURES 8, 9, 10 and 11 are similar views to FIGURES 1 to 5 of an alternative form of engine of the kind referred to embodying the invention and showing respectively various stages in the cycle of operation.

Figure 11:
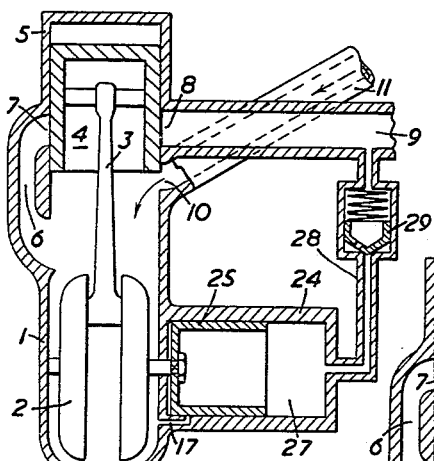
Figure 13:
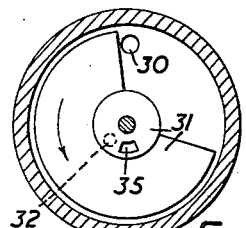
Figure 12:
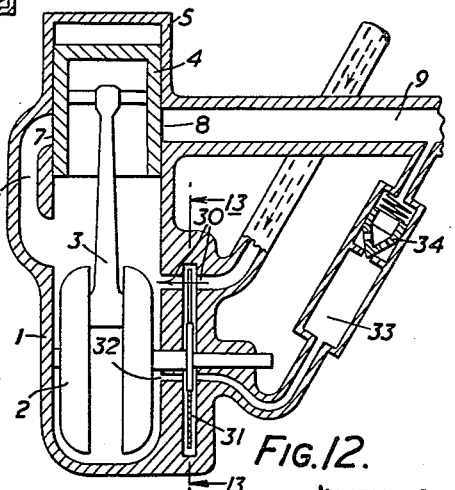

FIGURE 12 is a similar view to FIGURE 11 showing an engine incorporating a still further form of the engine, and FIGURE 13 is a diagrammatic cross-section in the plane 13—13 of FIGURE 12 in the direction shown by the arrows.

In the construction diagrammatically shown in FIGURES 1 to 5 the engine comprises a crank case 1 supporting a crank shaft 2 which in conventional manner also constitutes a flywheel, this crank shaft being connected, also in conventional manner, by a connecting rod 3 to a piston 4 arranged to reciprocate within the working cylinder 5 secured to the crank case. A transfer passage 6 extends in conventional manner between the interior of the crank case 1 and a transfer port 7 which is arranged to be uncovered by the piston at the end of its outstroke and the piston also uncovering towards the end of its outstroke, in conventional manner an exhaust port 8 leading to the exhaust passage 9, the arrangement being such that the exhaust port 8 begins to open slightly before the transfer port 7.

Also formed in the wall of the cylinder 5 is an inlet port 10 communicating through an inlet passage 11 through which a combustible mixture or air is supplied to the engine according to whether it is of the vaporized charge spark ignition type or of the diesel type.

Attached to the crank case 1 is a cylindrical valve housing 12 containing a rotary cylindrical valve 13 rigidly connected to the crank shaft 2 so as to rotate therewith, the interior 14 of the valve 13 having substantial volumetric capacity. Two ports, 15 and 16, are formed in the circumferential wall of the valve 13 where at the appropriate times they will bring the interior 14 of the valve respectively into communication with the interior of the crank case 1, through a passage 17, and with the exhaust passage 9 through a passage 18.

For simplicity of illustration neither a sparking plug nor a fuel injection device has been shown in the drawings since these are diagrammatic and such devices would be arranged in well known conventional manner which in itself forms no part of the invention.

The engine shown in FIGURES 1 to 5 rotates in a clockwise direction when viewed from the right hand side in these figures, and in the typical timing diagram for such an engine, shown in FIGURE 6 the approximate points in the cycle represented respectively in FIGURES 1, 2, 3, 4 and 5 are shown respectively at the points A, B, C, D and E. At the point in the cycle shown in FIGURE 1 (A in FIGURE 6) the piston 4 is descending and the exhaust port 8 has begun to open, the exhaust gases have begun to flow out at high velocity. At the point in the cycle shown in FIGURE 2 (B in FIGURE 6) the gas pressure in the exhaust passage 9, after initially rising sharply has fallen substantially below atmospheric pressure as described above, and at this time the port 16 has just come into communication with the passage 18, while the port 15 is closed so that air is drawn through the passage 18, due to the depression in the exhaust pipe 9, from the interior 14 of the valve 13 and a sub-atmospheric pressure thus produced in the chamber 14. While this sub-atmospheric pressure is maintained the port 16 closes so that the condition at the point in the cycle shown in FIGURE 3 (C in FIGURE 6) is that substantial sub-atmospheric depression is "locked up" in the chamber 14. This depression remains "locked up" during the period when the remainder of the burnt gas is escaping through the exhaust passage 9 and the transfer of air or combustible charge from the crank case 1 through the transfer passage 6 and the transfer port 7 is being completed in conventional manner. Upon further rotation of the crank shaft the point in the cycle indicated in FIGURE 4 (D in FIGURE 6) is reached at which the piston has started to ascend on its compression stroke and has closed the transfer port 7, and at this point the port 15 opens so that air or mixture flows from the interior of the crank case 1, which is now otherwise closed, through the passage 17 into the chamber 14 to reduce the depression therein. At this point in the cycle therefore, a sub-atmospheric depression has been transferred, from the exhaust pipe 9, where it occurred at the point in the cycle indicated in FIGURE 2, via the reservoir constituted by the chamber 14, to the interior of the crank case 1. Upon further upward movement of the piston the initial depression thus created in the crank case by this transfer will be increased in the normal manner until at the point in the cycle indicated in FIGURE 5 (E in FIGURE 6) the inlet port 10 is opened and air or combustible mixture is thus drawn into the crank case 1 under the combined effect of the vacuum caused by upward movement of the piston and the force due to the pre-established partial vacuum. The mixture is then ready for compression during the next downward movement of the piston followed by transfer into the working space of the cylinder during the parts of the cycle shown approximately in FIGURES 2 and 3 (B and C in FIGURE 6), during which period a subatmospheric depression will again be created and "locked up" in the chamber 14 in the manner described and the cycle thus started again.

In the modification diagrammatically illustrated in FIGURE 7 the general construction and cycle of operation of the engine is the same as that described with reference to FIGURES 1 to 5, and the corresponding parts of the engine are therefore indicated by the same reference numerals. In the construction shown in FIGURE 7, however, instead of the cylindrical valve housing 12 and associated cylindrical valve 13, the crank case 1 communicates with a reservoir 19 through a passage 20 controlled by a disc valve 21 driven directly by the crank shaft 2 which reservoir 19 also communicates through a further disc valve 22, also driven directly by the crank shaft, with a passage 23 communicating with the exhaust passage 9 and corresponding to the passage 18 in the construction shown in FIGURES 1 to 5.

Figure 7:
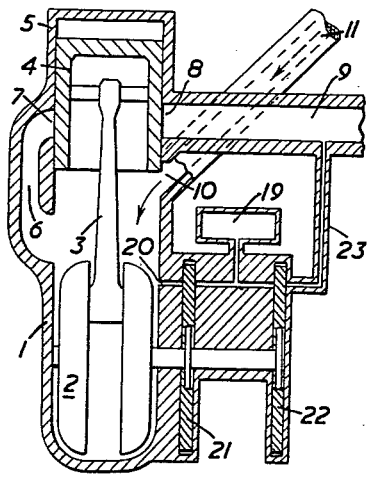
Figure 8:
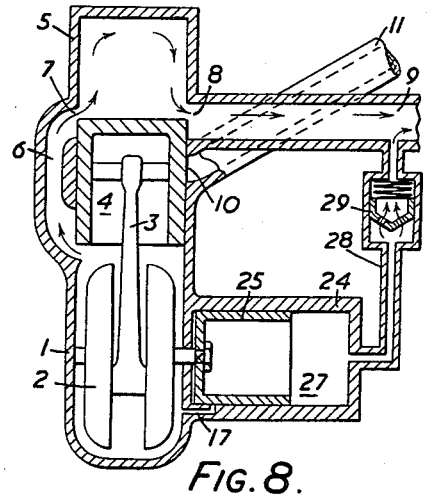

In the construction shown in FIGURE 7 the disc valve 22 is provided with a port (not shown) which comes into communication with the passage 23 at the same point in the cycle as the port 16 in the construction shown in FIGURES 1 to 5 comes into communication with the passage 18, while the disc valve 21 is provided with a port (not shown) which comes into communication with the reservoir 19 at the same point in the cycle as the port 15 comes into communication with the passage 17 in the construction shown in FIGURES 1 to 5.

Figure 2:
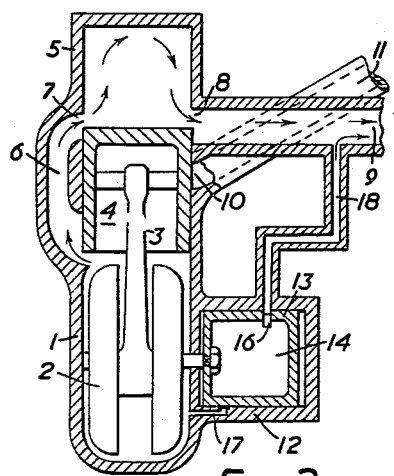
Figure 3:
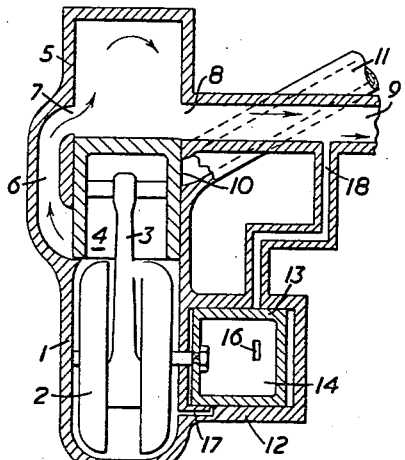
Figure 4:
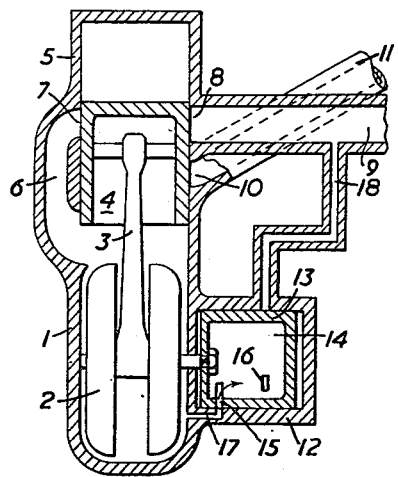
Figure 5:
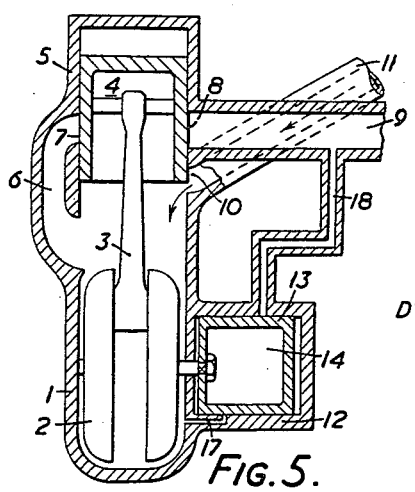

It will thus be seen that the construction shown in FIGURE 7 operates in the same general manner as that of the construction shown in FIGURES 1 to 5 except that the subatmospheric depression occurring in the exhaust passage 9 at the period in the cycle indicated in FIGURE 2 of the drawings, creates a depression in the reservoir 19 and subsequently at the period in the cycle indicated in FIGURE 4 a sub-atmospheric depression is produced in the crank case 1 by the bringing of the reservoir 19 into communication with the interior of the crank case by the disc valve 21. It will be apparent that in the construction shown in FIGURE 7 the size of the reservoir 19 can readily be varied to suit particular requirements such as the operating speed of the engine.

In the modified construction shown in FIGURES 8 to 11 the engine again is of the same general construction as that shown in FIGURES 1 to 5, and similar parts have therefore been identified by similar reference numerals and will not be again described. In the construction shown in FIGURES 8 to 11, however, there is secured to the crank case a cylindrical valve housing 24 containing an open-ended cylindrical valve 25 driven directly from the crankshaft 2 and having a port 26 in its circumferential wall which at the appropriate period in the cycle (that is to say the period indicated in FIGURE 10) brings the "reservoir" chamber 27 formed by the interior of the valve 25 and its housing 24 into communication with the interior of the crank case 1. The chamber 27 also communicates through a passage 28 and a light spring-loaded non-return valve 29 with the interior of the exhaust passage 9.

In the construction shown in FIGURES 9 to 11 the general cycle of operation is substantially as described with reference to FIGURES 1 to 5 except that, as will be apparent, the required sub-atmospheric depression will be produced in the "reservoir" chamber 27 by flow from it through the non-return valve 29 into the exhaust pipe 9 at the appropriate point in the cycle (the point indicated in FIGURE 2 of the drawings) this depression will then be "locked up" in the chamber 27 by the valve 29 irrespective of the exact rotational position of the crank shaft when the maximum depression occurs in the exhaust passage 9. The subsequent creation of a depression in the crank case 1 by bringing the reservoir chamber 27 into communication with the crank case 1 will occur at the point in the cycle indicated in FIGURE 10, i.e. at the point corresponding to that shown in FIGURE 4.

Figure 9:
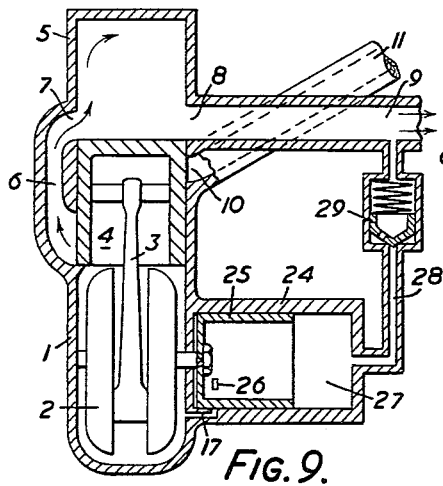
Figure 10:
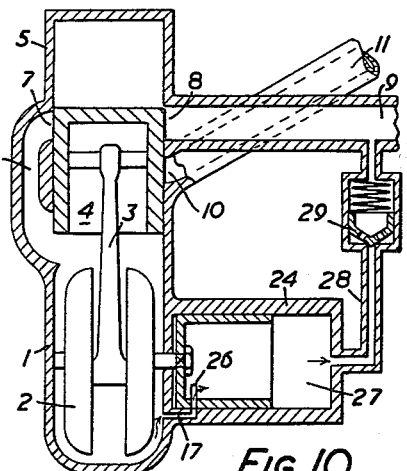

In the further modification illustrated in FIGURES 12 and 13 the general functioning of the engine would be similar to the engine shown in FIGURES 9 to 11 but, instead of an inlet port 10 controlled by the piston being provided, an inlet passage 30 is provided and controlled by a disc valve 31 which also has a part controlling communication, through a passage 32 between a "reservoir" 33 and the interior of the crank case 1. The reservoir 33 communicates as shown with the exhaust passage 9 through a light spring-pressed non-return valve 34.

The form of the disc valve and the manner in which it controls the passages 30 and 32 is shown in FIGURE 13 and the arrangement is such that the sub-atmospheric depression automatically "locked up" in the reservoir 33 in the same manner as such a depression is "locked up" in the reservoir 27 in the construction shown in FIGURES 9 to 11 is employed to partially evacuate the interior of the crank case 1 by the opening of the passage 32 by a port 35 for a short period a little prior to the point in the cycle shown in FIGURE 12, the passage 32 then being closed and the passage 30 being subsequently opened by the valve 31 at the point in the cycle shown in FIGURES 12 and 13, so that a charge is drawn into the crank case 1 rapidly through the inlet passage 30. The passage 30 will then be closed by the valve 31 to allow for compression of the charge in the crank case 1 prior to transfer through the transfer passage 6.

It will be understood that although the invention has been described with particular reference to engines of the kind in which the piston stroke is under the control of a crankshaft, it may be applied to so-called "free piston" engines in which the stroke of the piston can vary within designed limits. In this case it will be understood that communication between the container means in which air or a mixture is pre-compressed and the reservoir in which a subatmospheric depression is produced by the depression in the exhaust passage would be controlled by the piston or valve apparatus operated in synchonism with it.

What I claim as my invention and desire to secure by Letters Patent is:

1. An internal combustion piston engine comprising a working cylinder, an exhaust port or valve leading therefrom into the exhaust duct, container means for air or air-fuel mixture, a transfer port or valve leading into the cylinder from a said container means, precompression means for air or air-fuel mixture, and means for refilling the said container means during each working cycle and establishing a super-atmospheric pressure therein prior to opening of the transfer port or valve during each working cycle, wherein there is provided connected to the said exhaust duct, vacuum transferring means which is adapted to have produced in it a partial vacuum due to a partial vacuum developed in the exhaust duct after an initial surge of exhaust gas pressure as the exhaust valve or port is opened during each working cycle of the engine, the vacuum-transferring means being also connected to the said container means so as to apply thereto in the interval between closure of the transfer port or valve and the commencement of refilling of the said container means, during each working cycle, the partial vacuum so produced in the vacuum transferring means, whereby the said container means is partially evacuated to assist the said refilling thereof.

2. An engine as claimed in claim 1 wherein the vacuum transferring means comprises valve apparatus and a reservoir, the valve apparatus serving during each engine cycle to connect the reservoir to the exhaust duct when the subatmospheric depression occurs in the exhaust duct and to shut off such communication before or as said subatmospheric depression terminates and subsequently to place the reservoir in communication with the said container means prior to the refilling of the latter with air or mixture.

3. An engine as claimed in claim 2 in which the valve apparatus comprises or includes a rotary valve driven in synchonism with the engine crankshaft.

4. An engine as claimed in claim 3 in which the rotary valve is a hollow rotary valve the interior of which constitutes partially or wholly the said reservoir.

5. An engine as claimed in claim 1, wherein the vacuum transferring means comprises a reservoir which is connected to the exhaust duct through a one-way valve arranged to open only when the pressure in the exhaust duct is lower than the pressure in the reservoir and a valve operated in synchonism with the rotation of the crankshaft which serves to connect the reservoir to the container means during the appropriate period of each engine cycle.

6. An engine as claimed in claim 1 operating on the two-stroke cycle and comprising at least one cylinder, a piston which is arranged to reciprocate within the cylinder, is connected to a crank shaft within a crank case supporting the cylinder and serving to control transfer and exhaust ports in the cylinder so as to open such ports towards the end of the piston outstroke, said transfer port communicating with the crank case through a transfer passage, and the crank case constituting partially or wholly said container means to which air or combustible mixture is fed through an inlet part and in which such air or mixture is compressed during the outstroke of the piston, a reservoir, a vacuum transfer passage between said reservoir and the exhaust passage and controlled by valve means whereby during each engine cycle a sub-atmospheric depression is produced in said reservoir by the sub-atmospheric depression occurring in the exhaust passage, and valve means controlling communication between the reservoir and the interior of the crank case in synchronism with the crankshaft and in such manner as to bring the reservoir into communication with the interior of the crank case during a period of each engine cycle subsequent to the closing of the exhaust and transfer ports and prior to the admission of air or mixture to the crank case through the inlet port for subsequent compression on the outstroke of the piston.

7. An engine as claimed in claim 6, in which the valve means which control communication between the reservoir and the exhaust passage comprise a non-return valve arranged to open only when the pressure in the exhaust passage is less than that in the reservoir.

8. An engine as claimed in claim 6, in which the valve means controlling communication between the reservoir and the exhaust passage is mechanically operated in synchronism with the crank shaft.

9. An engine as claimed in claim 6 in which the reservoir is constituted at least partially by the bore of a cylindrical valve which constitutes the valve means controlling communication between the reservoir and the crank case.

10. An engine as claimed in claim 7 in which the reservoir is constituted at least partially by the bore of a cylindrical valve which constitutes the valve means controlling communication between the reservoir and the crank case.

References Cited in the file of this patent

UNITED STATES PATENTS 1,860,569 Bourne _____ May 31, 1932

FOREIGN PATENTS 189,008 Great Britain _____ Nov. 23, 1922